(12) United States Patent
Noell

(10) Patent No.: US 6,796,183 B2
(45) Date of Patent: Sep. 28, 2004

(54) METHOD FOR COMPENSATING FOR MECHANICAL OSCILLATIONS IN MACHINES

(75) Inventor: Matthias Noell, Weiterstadt (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 176 days.

(21) Appl. No.: 10/082,588

(22) Filed: Oct. 25, 2001

(65) Prior Publication Data

US 2002/0158180 A1 Oct. 31, 2002

(30) Foreign Application Priority Data

Oct. 26, 2000 (DE) .......................................... 100 53 237
Oct. 8, 2001 (DE) .......................................... 101 49 525

(51) Int. Cl.⁷ .............................................. G01N 29/00
(52) U.S. Cl. ............................. 73/593; 73/660; 73/659
(58) Field of Search ........................ 73/593, 587, 660, 73/659, 646; 702/56

(56) References Cited

U.S. PATENT DOCUMENTS

| | | | |
|---|---|---|---|
| 4,039,873 A | 8/1977 | Gensheimer | 310/74 |
| 4,724,763 A | 2/1988 | Bolza-Schunemann et al. | 101/426 |
| 4,937,758 A * | 6/1990 | Hayden et al. | 700/280 |
| 4,963,804 A * | 10/1990 | Geiger | 318/460 |
| 5,596,931 A | 1/1997 | Roessler et al. | 101/484 |
| 5,638,304 A * | 6/1997 | Billoud | 702/56 |
| 5,789,678 A * | 8/1998 | Pla | 73/660 |
| 5,809,843 A | 9/1998 | Barger et al. | 74/574 |
| 6,018,689 A | 1/2000 | Kumura et al. | 700/280 |
| 6,401,620 B1 * | 6/2002 | Buck et al. | 101/484 |

FOREIGN PATENT DOCUMENTS

| | | |
|---|---|---|
| DE | 4412945 | 10/1995 |
| DE | 19614300 | 10/1996 |
| DE | 19749134 | 6/1998 |
| DE | 19911096 | 9/2000 |
| DE | 19914627 | 10/2000 |
| EP | 0230518 | 8/1977 |
| EP | 0425352 | 5/1991 |
| EP | 0592850 | 4/1994 |

* cited by examiner

Primary Examiner—Hezron Williams
Assistant Examiner—Jacques Saint-Surin
(74) Attorney, Agent, or Firm—Davidson, Davidson & Kappel, LLC

(57) ABSTRACT

A method for compensating for a mechanical oscillation which has a frequency spectrum which can be approximately represented by a number of discrete frequency components, at a machine shaft via at least one actuator acting directly or indirectly upon the machine shaft. At least upon one of the discrete frequency components of the mechanical oscillation is superposed by the actuator, independently of the other frequency components, at least one substantially harmonic torque of the same frequency having a specific amplitude and phase in such a manner that the amplitude of the oscillation of the machine shaft at the this frequency is reduced.

12 Claims, 1 Drawing Sheet

METHOD FOR COMPENSATING FOR MECHANICAL OSCILLATIONS IN MACHINES

BACKGROUND INFORMATION

The present invention relates to a method for compensating for a mechanical oscillation, in particular for a rotational oscillation, which has a frequency spectrum which can be approximately represented by a number of discrete frequency components, at a machine shaft, in particular in a printing unit or in a printing machine, via at least one actuator acting directly or indirectly upon the machine shaft.

Moreover, the present invention relates to a printing unit having at least one machine shaft driven by an actuator and a measuring device for picking up the mechanical oscillation of the machine shaft.

A mechanical oscillation is to be understood both as periodic changes of one or more coordinates of the machine shaft, for example, rotational oscillations, vibrational oscillations or the like, and superpositions of a plurality of periodical changes. The term machine shaft chosen hereinafter denotes a mathematical axis of rotation and, in this context, can be, in particular, any shaft, axle, machine axis, roll, cylinder, or the like, of a machine. In this connection, the term machine shaft will include hereinafter also a virtual axis of rotation, that is a signal calculated from coordinate values of one or a plurality of axes of rotation, in particular the difference between coordinates of two real machine shafts.

In the case of machines having speed or positional control of at least one machine shaft, it is possible that changing torques act upon the controlled shaft because of cam discs, imbalances, or other constructional conditions. Depending on the transmission ratio between the shaft of the original torque and the controlled shaft, oscillations are superposed on the latter whose frequency is proportional to its rotational speed, i.e., has a fixed machine order. Moreover, excitations having a fixed frequency which is independent of the speed of the controlled shaft can be superposed upon the rotary motion. In both situations, the frequency spectrum of the mechanical oscillation of the position, speed and acceleration of the controlled shaft contains disturbing discrete frequencies which will be referred to as disturbances hereinafter, independently of their origin. If the intention is for the machine shaft to rotate at a constant speed, then disturbances give rise to deviations from the setpoint speed or from the rotational setpoint angle which cannot be completely corrected but only reduced to a sufficient degree with increased outlay in connection with the driving mechanism.

Especially in the case of printing machines, whether they are sheet-fed printing presses or web-fed printing presses, the accuracy with which the speed of the controlled shaft is maintained or with which a rotational setpoint position is followed, has a decisive influence on the quality of the product. Disturbances having an integral frequency ratio to the rotational frequency of the controlled shaft of a paper guiding cylinder are generally negligible since they are equal for all print images or print sheets. However, all other frequencies are disturbing because they can give rise to the so-called "ghosting" when, in other words, successive sheets are printed at an offset relative to one another.

If a sheet-fed printing press is composed of a plurality of separately driven, mechanically decoupled parts such as printing units, printing unit groups, or the like, then variations in the angular difference between two successive paper guiding cylinders, that is two controlled shafts, at the sheet transfer between the parts of the printing machine become directly noticeable as variations in the circumferential register. In this context, it is desired for the transfer angle to be identical from sheet to sheet; however, the transfer angle is impaired by oscillations of non-integral order.

Diverse devices and methods for damping mechanical oscillations, in particular rotational oscillations, in printing machines are already known.

European Patent EP 0 592 850 B1 describes a device and a method for damping mechanical oscillations of printing machines. This device features at least one actuating member and one vibration sensor; these can be arranged in a control loop as well. In this context, the damping of printing quality impairing mechanical oscillations in the stock-guiding system of a printing machine is directed to the compensation for asynchronous oscillations, that is only for oscillations which occur non-periodically with the revolutions of the rotating parts.

German Patent Application DE 44 12 945 A1 discloses a device and a method for damping mechanical oscillations of printing machines which also allows integral oscillation orders to be compensated for. The data for driving the actuating members is determined either by calculation or by measurement in a test run of the printing machine.

German Patent Application DE 199 14 627 A1 relates to a method and a device for compensating for a rotational oscillation in a printing machine, the method being designed in such a manner that at least one intrinsic oscillation shape of the printing machine is determined and that a specific counter-torque for compensating for the torques that excite oscillations in the intrinsic shape is applied to at least one location at which this intrinsic shape does not have the amplitude 0.

Further related art is constituted by German Patent Application 197 49 134 A1, wherein an active oscillation damping device and a method for identifying the transfer function in an active oscillation damping device are disclosed. A control device reads in a residual oscillation signal from a residual oscillation detector of the active oscillation damping device synchronously with a predetermined input sampling timer. Subsequent to reading the residual oscillation signal as a time series for each frequency, an FFT (Fast Fourier Transformation) is carried out for each time series to obtain a frequency component of the original sinusoidal wave. A calculation of the inverse FFT is then carried out for the result of the composition of each obtained frequency component in order to derive a pulse response as a transfer function.

Furthermore, European Patent EP 0 425 352 B1 describes a device for actively damping oscillations whose energies are concentrated in frequencies including a fundamental and the harmonic thereof. The device, which is used for damping oscillations of a mechanical part, includes vibration pick-ups, which pick up characteristic electrical signals, in amplitude and phase, of the vibration at a point of the mechanical part, at least one actuator which is capable of exerting a force on the mechanical part against the vibration, and an arithmetic unit which is connected to the vibration pick-up and to the actuator. The output signals of each vibration pick-up are subjected to a synchronous detection with the aid of reference signals which correspond to the different frequencies which include an energy concentration. To this end, each output signal, after being sufficiently amplified, is subjected to a sampling and to an analog-to-digital conversion for each frequency generated by a synthesizer. The random samples experience a synchronous demodulation including a multiplication and a passage through a low-pass filter and for each retained frequency. The reference signals are obtained with unaltered phase utilizing a linear relation with the fundamental frequency. For each frequency at which energy is concentrated in the mechanical oscillation, a recursive adaptation algorithm is carried out by the arithmetic unit in such a manner that each actuator receives a signal of its own which includes the sum of the contributions of the different frequencies.

German Patent Application 196 14 300 A1 discloses a method for the self-regulating compensation for the effects of the irregular concentric running of a roller or a reel for collar eccentricity compensation in a reel system or the winding up or unwinding of sheet-like material. In this context, the roller rotates at a changed speed due to the varying collar radius or roller radius. The actual draw value is approximated by at least one rotary-harmonic sine function of exclusively integral order whose argument is the rotational angle of the roller, the sinusoidal approximation being carried out according to the orthogonal correlation or in accordance with the harmonic analysis according to Fourier, and estimates being calculated for the amplitude and phase of the sinusoidal signal caused by the irregular concentric running. An additional torque which is calculated from the estimates is added to the setpoint torque value for the roller.

The determination of suitable compensation data, in particular for printing machines, constitutes a problem of compensation methods and compensation devices heretofore, which impedes the broad application thereof. If a storage device is used for the compensation data, then, in common compensation approaches heretofore, a calculation or a test run for measuring suitable compensation data are required in advance. Both methods turn out to be difficult, time and cost intensive. Typical compensation approaches in printing machines consider oscillations including a plurality of frequencies as a whole. Because of this, it is possible only with difficulty to adapt the compensation in a differentiated manner as a function of the machine dynamics, control, disturbance, or the like. In particular, an adaptation to oscillation shapes which vary strongly over time or to a changed machine dynamics can be implemented only with difficulty.

When calculating the oscillations, there is a risk of systematic errors if simplifying or even false assumptions are made. An approach of that kind implies that only oscillations which are accessible to calculation can be compensated for. Moreover, conventional test runs for determining the oscillation involve the risk of measuring errors due to different, further disturbances. When utilizing the determination of the intrinsic shapes of a machine, a machine-specific design is required.

SUMMARY OF THE INVENTION

An object of the present invention is to reduce unwanted oscillations, also referred to as disturbances, at least one shaft or virtual machine shaft of a machine rotating at a substantially constant speed.

The present invention provides a method for compensating for a mechanical oscillation (2), in particular for a rotational oscillation, which has a frequency spectrum which can be approximately represented by a number of discrete frequency components, at a machine shaft, in particular in a printing unit or in a printing machine, via at least one actuator (11) acting directly or indirectly upon the machine shaft. Upon at least one of the discrete frequency components of the mechanical oscillation (2) is superposed by the actuator (11), independently of the other frequency components, at least one substantially harmonic torque (14) of the same frequency having a specific amplitude and phase in such a manner that the amplitude of the oscillation of the machine shaft at this frequency is reduced.

The present invention also provides a printing unit having at least one machine shaft driven via an actuator (11) and a measuring device (5) for picking up the mechanical oscillation (2) of the machine shaft, wherein the printing unit features a filter (7) or a correlator (7) for the purpose of determining the amplitudes and phases of a number of discrete frequency components of the frequency spectrum of the mechanical oscillation (2).

The present invention further provides a printing unit group having at least one machine shaft driven via an actuator (11) and a measuring device (5) for picking up the mechanical oscillation (2) of the machine shaft, wherein the printing unit group features a filter (7) or a correlator (7) for the purpose of determining the amplitudes and phases of a number of discrete frequency components of the frequency spectrum of the mechanical oscillation (2).

Existing disturbances in the form of mechanical oscillations at a shaft exhibit a frequency spectrum which can approximately be represented by a number of discrete frequency components. The frequencies developing in the process are typically discrete and approximately constant but depend on the machine speed, thus having a fixed order, or are independent thereof As mentioned before, excitations corresponding to just the rotational frequency or to multiple thereof are generally not disturbing in printing machines but can also be eliminated using the method according to the present invention. The equivalent applies to virtual machine shafts, that is to a signal which is calculated via a (preferably linear) relation from the position, speed, or acceleration of one or a plurality of real shafts, the signal being in particular the difference of the coordinates of two real shafts.

The method according to the present invention for compensating for a mechanical oscillation or for a disturbance, in particular for rotational oscillations, which has a frequency spectrum which can be approximately represented by a number of discrete frequency components, at a machine shaft, in particular in a printing unit, via at least one actuator acting directly or indirectly upon the machine shaft is characterized in that discrete frequencies of this mechanical oscillation are compensated for separately. These can be both fixed frequencies and fixed orders, in other words, frequencies which bear a fixed ratio to the rotational frequency of the shaft. The actuator, which acts directly or indirectly upon the machine shaft, superposes upon each discrete frequency component of the mechanical Em oscillation, independently of the other frequency components, at least one substantially harmonic torque of identical frequency having a specific amplitude and phase in such a manner that the amplitude of the oscillation of the machine shaft is reduced for this frequency. In other words, the compensation is carried out in that, for each frequency component to be compensated for of the frequency spectrum separately, a substantially harmonic torque determined by amplitude and phase, that is a sinusoidal or cosinusoidal torque of the same frequency having a specific amplitude and phase is superposed to a driving torque in such a manner that the component of the oscillation having this discrete frequency is reduced at the machine shaft. In this context, the compensation torque can be exerted by an arbitrary actuator, in particular by a motor which acts directly or indirectly upon the machine shaft anyway.

The method according to the present invention also permits a compensation for frequencies which do not bear an integral ratio to the rotational frequency of the machine shaft (asynchronous oscillation) by treating them as synchronous oscillations referred to a frequency which is in a fixed ratio to the rotational frequency of the machine shaft. As a rule, the fixed relation is fractional rational, that is a number from the rational numbers if the disturbance is caused by a machine part which is coupled via a gearing.

The method according to the present invention, together with the printing unit according to the present invention have a number of advantages.

Since the method in each case compensates for specific discrete frequency components, measurements of the amplitude and phase of the mechanical oscillation of the machine shaft at least one specific point in time are required only for one particular frequency. Because of this, the method is virtually unaffected by other frequencies or also stochastic disturbances of the mechanical oscillation. Via the iteration of measurements related to a discrete frequency over time, the in each case instantaneous amplitudes and phases of the discrete frequency component of the mechanical oscillation are determined so that a compensation which is close in time and adapted to the respective prevailing situation is made possible.

The method according to the present invention permits a simple compensation for anharmonic periodic oscillations with an associated angular frequency $\omega$ from the relation $\omega=2\pi/T$. where T denotes the oscillation period, in that, in each case separately, the harmonic oscillations of angular frequencies $n \times \omega$, with n being a natural number, which have specific amplitudes and phases and represent the anharmonic oscillation, are compensated for. Likewise, the method according to the present invention makes it possible to take into account the amplifications and phase shifts of the different frequency components used for compensation from the actuator to the compensation shaft. Known compensation methods heretofore which work with non-harmonic compensation torques, as are usually stored in storage devices, can take into account this dependence of the transmission on the machine dynamics only with difficulty since the curve shape stored in the storage device defines the amplitudes and phases of the harmonic waves with respect to the fundamental wave. However, the determination of the amplitudes and phases of individual frequency components is flexible. Thus, the method according to the present invention eliminates diverse limitations of existing compensation methods and, in this manner, makes a compensation easier in practical use.

Moreover, the method according to the present inventions makes do without calculating the mechanical oscillation of the machine shaft. Because of this, the risk of systematic errors in the case of simplifying or false assumptions is averted; an extensive modeling of the machine or a computational effort by specialists are dropped.

The method according to the present invention has the further advantage of being usable both for unsteady oscillations, that is oscillations which vary over time, for a machine state which varies over time, for synchronous and asynchronous oscillations, or also for oscillations having a constant frequency. Individual frequency components which are in a complex relation to the machine frequency, whether they are sidebands of oscillations or oscillations resulting from modulation, can also be compensated for using the method according to the present invention.

In principle, it is possible for an arbitrary or a necessary number of different frequency components to be compensated for using the method according to the present invention since the compensations do not mutually influence one another. For instance, only the dominating, largest disturbing frequency components or orders have to be known or to be measured in amplitude and phase to permit the compensation therefor. Such a concentration on the compensation of the most disturbing frequencies permits considerable improvements already with little effort. Since different orders or frequency components can be compensated for as a function of the machine speed, it is advantageously possible, for example, to always compensate for all oscillation frequency components near the resonant frequency of the machine or of parts of the machine.

Knowing the transfer function, it is also possible to feed in at least one compensation torque at a large distance from the machine shaft to be balanced. Generally, the method is rugged with respect to changes in the machine dynamics such as the transition from the uncontrolled to the controlled machine or the selection of different control parameters or controls.

Using the method or the printing unit according to the present invention, it is possible for the quality of the products to be considerably increased since an improved, from rotation to rotation identical curve of the speed or position as a function of the angle of the machine shaft is possible. The method according to the present invention allows the separation points of mechanically decoupled sheet-fed printing presses to be positioned with considerably greater repeat accuracy than with conventional methods.

BRIEF DESCRIPTION OF THE DRAWING

Further advantages and expedient embodiments of the present invention will be depicted by way of the following FIGURE and the description thereof. Specifically.

DETAILED DESCRIPTION

Figure 1:
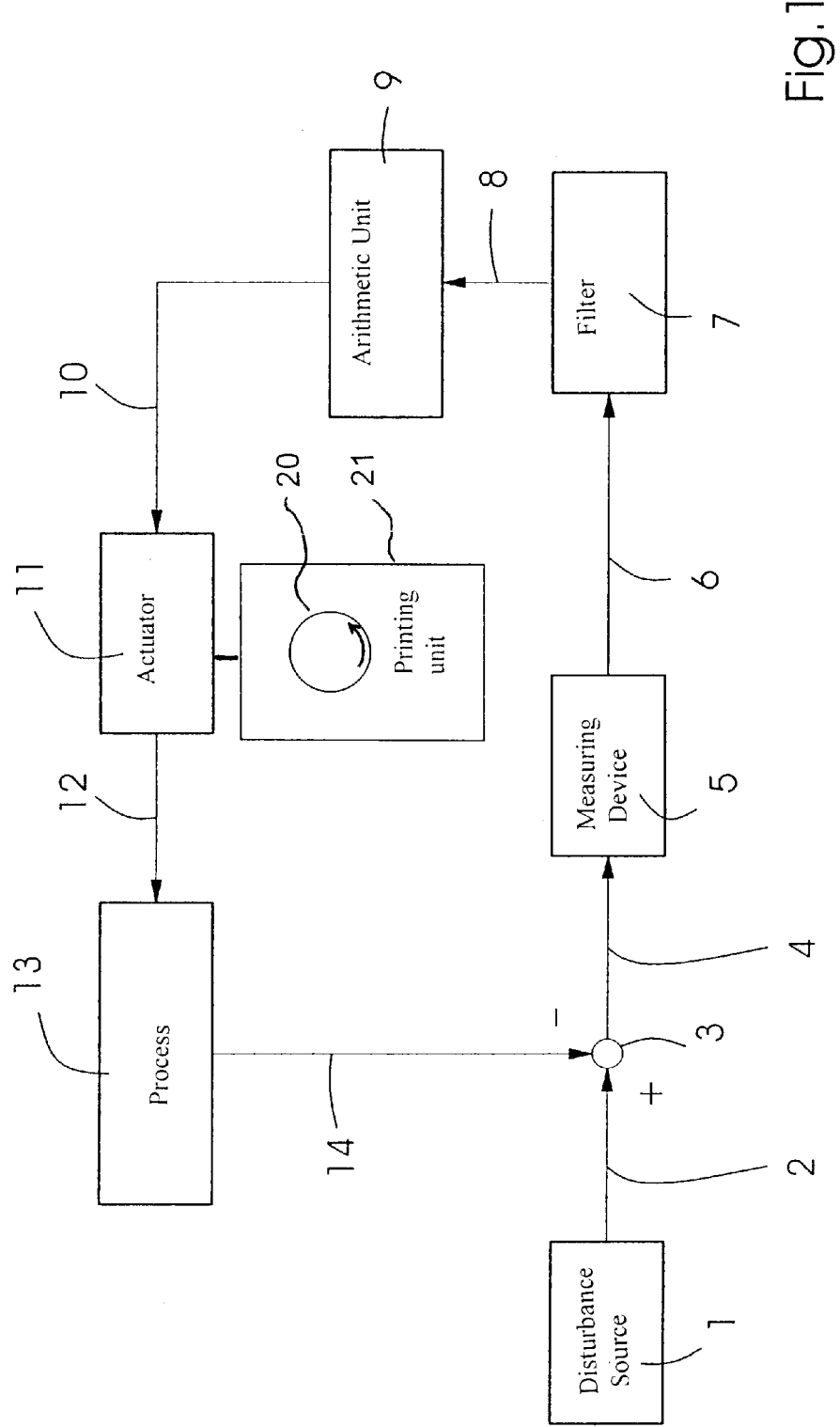
FIG. 1 shows the principle of the compensation for a fixed compensation frequency $\omega_S$ while a disturbance is acting.

The principle of operation of the method and of the printing unit according to the present invention will be described in detail by way of FIG. 1 and the following explanations. The description of the compensation for a mechanical oscillation or disturbance of a machine shaft 20 of a printing unit 21 having a specific angular frequency $\omega_S$ or an order r relative to the machine frequency, with r being from the real numbers, will be given without limiting the universality. Since the compensation is carried out for a specific angular frequency $\omega_S$ of the mechanical oscillation or disturbance independently of other angular frequencies or orders, so-called superposition principle, it is possible, in particular, to compensate for an arbitrary number of different angular frequencies $\omega_{Si}$, with i being from the natural numbers, or orders $r_i$, with i being from the natural numbers, when multiply using the method, whether in parallel or successively. In this manner, it is achieved that a machine shaft 20 rotates at a constant speed, even when acted upon by irregular torques.

The real or virtual machine shaft at which the oscillation or disturbance is compensated for, will also be referred to as compensation shaft hereinafter. If constant orders r are to be compensated for, one prerequisite is that this compensation shaft does not perform any significantly large variations $\delta\omega_S(t)$ about the mean rotational frequency $\omega_S$, that is that it rotates at a relatively uniform speed. This can be achieved, for example, by a speed control or angle control of this shaft or of another machine shaft coupled to the compensation shaft. Such a case is especially given in printing machines.

Such a restriction is necessary since the process acting between the compensation and the machine shaft as well as the filter required for the measurement generally transmit different frequencies having different amplifications and phase shifts. If frequency variation $\delta\omega_S(t)$ is too large, then this results in a modulation of the order r to be compensated for, both in the case of the disturbance at the compensation shaft and increasingly when measuring the filtered signal, which is unfavorable for a complete compensation. In order to further increase the quality of the compensation, it is even possible to further reduce speed variations of the compensation shaft using the method or the printing unit according to the present invention. In a printing machine, it would be possible, for example, to compensate for the first machine order to improve the components for disturbing asynchronous orders.

FIG. 1 shows the compensation principle for a compensation frequency $\omega_S$. In this context, the compensation frequency can be fixed, that is $\omega_S = 2\pi f_S$ = const. or be a fixed compensation order, that is $$\frac{d\varphi_S(t)}{d(t)} = r\frac{d\varphi_M(t)}{dt} = \omega_s + \delta\omega_s(t),$$

where $\phi_S(t)$ denotes the phase angle of the disturbance, r refers to the order of the disturbance, that is the transmission ratio between the possibly hypothetical disturbance shaft and the compensation shaft, and $\phi_M$ is the angle of the compensation shaft $\delta\omega_S(t)$ denotes the deviation of the angular frequency from the mean frequency of the disturbance. If the speed of the compensation shaft is constant, for example, because all occurring disturbances are completely compensated for, then it applies that $\omega_S t = r\Phi_M(t)$. The differences between the signals occurring in both cases in the event of small variations in speed hardly impair the compensation for fixed orders. Therefore, the principle of operation of the method according to the present invention can mainly be described on the basis of a disturbance having a fixed compensation frequency $\omega_S$. However, in the two mentioned cases, differences arise in the implementation since when compensating for fixed frequencies, all oscillations are time-dependent but when compensating for fixed orders, they are angle-dependent.

In FIG. 1, it is schematically shown in the form of a control loop how the principle of compensation is carried out for a fixed compensation frequency $\omega_S$ while a disturbance is acting. A disturbance or mechanical oscillation 2 which originates at a disturbance source 1 and has an amplitude $a_0$ and a phase $\alpha$ acts upon a summing point in a manner corresponding to a measured quantity. Signal 4 is picked up by a measuring device 5 (for example, a sensor for shaft 20 of a print unit 21) whose measured signal 6, after passing through a filter 7 or a correlator 7, brings about measured signal 8 having an amplitude $c_0$ and a phase $\gamma$. Without limiting the universality, it will be assumed that measuring device 5 has a transfer function of 1. If it has a transfer function not equal to 1, then the disturbance can also be modeled as acting downstream of measuring device 5. This measured signal 8 serves as input of an arithmetic unit 9. The output of arithmetic unit 9 is a control signal for manipulated variable 10 which has an amplitude $b_0$ and a phase $\beta$ and which is fed to an actuator 11. Signal 12 emanating from actuator 11 brings about a torque which, influenced by process 13, is used as a harmonic torque 14 having an amplitude $K_P$ $b_0$ and a phase $\beta + \phi_p$ to generate a compensation for disturbance 2 at summing point 3. The torque is substantially harmonic.

The starting point of the consideration of FIG. 1, is a sinusoidal disturbance a(t) which, without compensation, arises at the compensation shaft and which can have a cause that is not decisive here for the discussion. In the case of a fixed frequency, it has the shape $a(t) = a_0 \sin(\omega_s t + \alpha)$, where $a_0$ denotes the amplitude of the disturbance and $\alpha$ denotes its phase. In the case of a fixed order, the disturbance has the shape $a(\phi_M(t)) = a_0 \sin(r\phi_M(t) + \alpha)$, where $\phi_M(t)$ denotes the angle of the compensation shaft which is time-dependent, with t denoting the time. The order of the disturbance is denoted by r, in other words the ratio between the frequency of the disturbance and the rotational frequency of the machine shaft.

This disturbance acting upon the compensation shaft can be calculated from the measured signal of a sensor at the compensation shaft. In this context, it is unimportant which concrete type of sensor is selected; it is only required for the sensor to measure the angle, the speed, or the acceleration of the shaft. In particular, rotary transducers which are employed at the shaft for machine control anyway can be used for the measurement as well. The acceleration, the speed, or the angle of the compensation shaft can be the basis for carrying out the compensation. If one of these signals is compensated, the others are compensated as well. Preferably, the signal is selected depending on the sensor. When using a rotary transducer, for instance, the angle or the speed are advantageous because they can be determined with relatively little disturbance. Possibly, the signals of the sensors are to be converted into one another by integration or differentiation.

Amplitude $b_0$ and phase $\beta$ of the harmonic oscillation for compensation, that is of the substantially harmonic torque for compensation, can then be determined from the so obtained signal having an exact amplitude $c_0$ and phase $\gamma$. This is possible both in the frequency domain and in the time domain. In the frequency domain, for instance, amplitude $c_0$ and phase $\gamma$ can be directly calculated for angular frequency $\omega_S$ via a fast Fourier transformation (FFT) over a short time interval. In this simple case, it applies that $a_0 = c_0$ und $\alpha = \gamma$. In the time domain, initially, the harmonic oscillation having angular frequency $\omega_S$ can be isolated via a narrow-band bandpass filter if the mechanical oscillation is a general oscillation having a specific frequency spectrum and, for example, phase $\gamma$ can be determined on the basis of the zero crossings of the resulting signal. Amplitude $c_0$ can be determined, for example, by way of the detected maximums and minimums of the harmonic oscillation signal or by multiplying the mean value of the unidirectional oscillation by $\pi/2$.

Alternatively to filtering and subsequently determining the amplitude and phase of the oscillation selected via the filter by way of the extremes or zero crossings, it is also possible for the oscillation parameters (amplitude and phase) to be determined via a correlation method, in particular, via an orthogonal correlation method. The orthogonal correlation involves diverse advantages since, for example, correlation parameter $T_{korr}$ a provides a parameter which permits a selection between high measuring accuracy and short measuring time in small steps, in particular, in multiples of the period duration. This makes it possible for relatively large oscillations to be initially quickly reduced by using small correlation periods and, subsequently, to be eliminated during larger correlation periods. The effect of the orthogonal correlation is very similar to that of the measuring method with a suitable bandpass filter. In particular, the damping has a tendency to increases disproportionally with increasing distance of a frequency from the measuring order or measuring frequency.

It is the goal of the filtering via the bandpass filter to very slightly damp the frequency to be measured and to damp all other frequencies as highly as possible. According to tendency, this goal is attained better with decreasing filter bandwidth but, at the same time, the transient recovery time increases, the transient recovery time corresponding to the duration from which the error of the filter output signal no longer exceeds a selected value, for example 1%, subsequent to a change in the oscillation at the filter input. This is inherent in the principle since changes in the input signal correspond to high frequencies which are damped to a greater degree because of the smaller bandwidth. The transient recovery time limits downwards the period of time from the beginning of the measurement until the first compensation step and thereby also the minimum sampling time of a compensation control.

If the intention is for the oscillations to be compensated for as quickly as possible, then correspondingly small transient recovery times and, consequently, larger filter bandwidths are required. Because of this, the output signal of the filter still contains other frequencies which superpose themselves as a disturbance upon the determination of the amplitude and phase of the measuring frequency. The effect of the disturbance of a frequency on a measuring frequency can be considerably reduced by averaging the measuring values over an approximately integral number of period durations of the beat frequency. In this context, the averaging must not be applied to the calculated amplitude and phase of the measuring frequency but has to be applied to the complex representation of the oscillation of the measuring frequency, that is to the real component and to the imaginary component (the components which are orthogonal to each other). The total time required for the measurement of the compensation frequency for a filter is composed of the transient recovery time and the beat period duration. In an orthogonal correlation measurement, this time can be shorter than a measurement with comparable accuracy via a narrow-band filter since the beat period duration approximately corresponds to the minimally attainable sampling time of a compensation control.

When using a filter, an averaging via the beat period which is quite long in the case of a closely neighboring frequency, and even a correlation can be dropped if the disturbance frequency is measured as well and its signal component is eliminated by subtracting the error term which is caused by the disturbance frequency and calculated therefrom. This procedure can be also applied to a plurality of disturbances. The mutual elimination of repercussions of the measuring frequency on the disturbance frequencies is also possible.

In general, it should be mentioned with regard to the compensation according to the present invention that a harmonic oscillation or a harmonic torque is superposed upon a driving torque, which acts upon the compensation shaft, in such a manner that $c_0=0$. In other words, the amplitude of the oscillation at the frequency $\omega_S$ is eliminated at the shaft. This is the case, when for the phase and amplitude of the oscillation used for compensation or for the used torque it is applying that $b_0=a_0/K_P$ and $\beta=\alpha-\phi_P$. In this context, $K_P$ is the amplification and $\phi_P$ is the phase shift of the process from the manipulated variable, for example the setpoint torque of the motor, to the compensation shaft, for example with the speed as the basis of the compensation, for the fixed frequency $\omega_S$. It should be taken into consideration, that in the case of controlled machines, $K_P$ and $\phi_P$ are also dependent on the structure and parameters of the controller since the process is relevant in the case of a closed-loop control circuit.

Frequency $\omega_S$ of the substantially harmonic torque which is used for compensation can be determined as a function of the natural frequency of the machine or of the speed of the machine. In this context, the frequency of the substantially harmonic torque can bear a fixed ratio to a natural frequency of the machine, and have, in particular, the ratio 1 or an integral multiple thereof.

Phase $\alpha$ of the disturbance of the form $a=a_0 \sin(\phi_{Ref}+\alpha)$, phase $\beta$ of the compensation signal of the form $b=b_0 \sin(\phi_{Ref}+\beta)$ and phase $\gamma$ of the measured signal of the form $c=c_0 \sin(\phi_{Ref}+\gamma)$ refer to a reference angle signal of the form $\sin(\phi_{Ref})$ of identical frequency. For compensating for a fixed frequency, it is possible according to the method of the present invention to calculate the reference angle as $\phi_{Ref}=\omega_S t$, or, for compensating for a fixed order, as $\phi_{Ref}=r\,\phi_M$ from angle $\phi_M$ of the compensation axis. To compensate for integral orders r=1, 2, . . . , it is sufficient for this purpose to measure angle $\phi M$ in a value range of one revolution, for example, $\phi_{Ref} \in \{0 \ldots 2\pi\}$. To compensate for non-integral orders, it is required to distinguish an angular range of more than one revolution. To compensate for rational orders q=n/m, with n and m being natural numbers, it is sufficient to distinguish an angular range of m revolutions, for example, $\phi_{Ref} \in \{0 \ldots 2\,m\pi\}$. Alternatively to calculating reference angle $\phi_{Ref}$ from the angle of the compensation axis, the method according to the present invention permits also a direct measurement of the reference angle, for example, at an axis which causes the disturbance.

In an advantageous embodiment of the method according to the present invention, compensation parameters $b_0$ und, $\beta$ are fixedly set, depending on the speed of the compensation shaft, in such a manner that the disturbance is compensated for at the compensation shaft as best as possible. That is, that the measured amplitude $c_0$ becomes as small as possible via the interaction of the disturbance and the compensation which is transmitted to the machine shaft by means of the process. In the simplest case, this can be done by systematic trials but can also be automated, as is rendered possible, for example, using the identification method described hereinafter. The preferred values can be determined for different machine speeds and stored, for example, in a table. For speeds which are not included in the table, it is possible for the parameters to be interpolated during the operation from the table values for the next higher and next lower speed by way of a suitable method, for example, in a linear manner or via splines. It is a special advantage of this embodiment that it is no longer required to measure the disturbance during the operation of the machine and that complex calculations are dropped so that the method according to the present invention can be implemented with simple means and even be integrated in existing controllers. However, it should be mentioned that this embodiment can be used with the desired result, in particular, in the case of steady-state disturbances as well as steady-state processes. In other words, the changes in the amplitude $a_0$ or phase $\alpha$ of the disturbance as well as in the amplification $K_P$ or phase shift $\phi_P$ of the process during the course of time result in an imperfect compensation. However, if the disturbances and process change only slightly, it is possible for disturbances to be reduced to a great extent even with imperfect compensation.

In an advantageous refinement of the method according to the present invention, initially, amplitude $c_0$ and phase $\gamma$ are determined without compensation while the machine is in operation in order to calculated the optimum compensation parameters $b_0=c_0/K_G$ und, $\beta=\gamma-\Phi_G$ therefrom. These compensation parameters are finally used to carry out the compensation. For calculating the compensation parameters, constants $K_G=K_PK_F$ and $\phi_G=\phi_P+\phi_F$ are required. In this context, $K_P$ and $K_F$ are the amplification and $\phi_P$ and $\phi_F$ the phase shifts of the process or filter at an angular frequency $\phi_S$. These can be obtained, for example, from the transfer function of the controlled machine at angular frequency $\omega_S$, the transfer function being obtained by modeling. $K_G$ and $\phi_G$ can also be determined in a test run. To this end, the parameters can be directly calculated as $K_G=c_0/b_0$ and $\phi_G=\gamma-\beta$, for example, from the measurement of amplitude $c_0$ and phase $\gamma$ without compensation as well as from compensation parameters $b_0$ and $\beta$ determined in the test run at optimal compensation. As an alternative, the identification of $K_G$ and $\phi_G$ in a test run, which will be described hereinafter, is also possible. It is an advantage of this embodiment of the present invention that no assumptions on amplitude $a_0$ and phase $\alpha$ of the disturbance are required. In particular, disturbances which vary very slowly over time can be compensated for with these means. Using this advantageous embodiment, a compensation can be attained even if the phase of disturbance $\alpha$ is unknown when switching on the machine because the disturbance is caused, for example, by a shaft which has no integral revolution ratio to the compensation shaft and whose angle is not measured. In an optimum compensation control, it can be achieved that only one measurement and one control step are required for a substantially complete compensation.

In a further advantageous embodiment of the present invention, a compensation control is implemented which uses the parameters of the compensation with $b_0$ and $\beta$ which is currently carried out and the disturbance with measured amplitude $c_0$ and measured phase $\gamma$ remaining at the compensation shaft in the case of this compensation to calculate therefrom updated optimum compensation parameters for a complete compensation for the disturbance and to carry out the compensation therewith.

After each change of the compensation parameters $b_0$ and $\beta$, the process and filter need a certain time for reacting to these changes. The time until which a new equilibrium develops can amount, for example, to several seconds. The sampling time of the compensation control, in other words, the time span between two control steps, should therefore correspond at least to the reaction time to changes in a manipulated variable. If, since a first control step, a compensation having an amplitude $b_{01}$ and a phase $\beta_1$ is active, then, in a second control step, initially amplitude $c_{02}$ and phase $\gamma_2$ of the remaining disturbance at the compensation shaft are measured, and amplitude $b_{02}$ and phase $\beta_2$ of the compensation are calculated from $b_{01}$, $\beta_1$, $c_{02}$ and $\gamma_2$ and from constants $K_G=K_PK_F$ and $\phi_G=\phi_P+\phi_F$. Subsequently, the compensation is carried out with parameters $b_{02}$ and $\beta_2$ until the next control step. The new compensation parameters can be calculated, for example, via the auxiliary quantities $$C_{G2}=C_2/K_G$$

$$\gamma_{G2}=\gamma_2-\Phi_G$$

$$Z=C_{G2}\sin(\gamma_{G2})+b_1\sin(\beta_1)$$

$$N=C_{G2}\cos(\gamma_{G2})+b_1\cos(\beta_1)$$

as follows:

$$b_{02}=\sqrt{c_{G2}^2+b_{01}^2+2c_{G2}b_{01}\cos(\gamma_{G2}-\beta_1)}$$

$$\beta_2 = \begin{cases} \arctan(Z/N) & \text{for} \quad N>0 \\ \arctan(Z/N)+\pi & \text{for} \quad N<0 \\ \pi/2 & \text{for} \quad N=0 \land Z \geq 0 \\ -\pi/2 & \text{for} \quad N=0 \land Z<0 \end{cases}$$

It is clear to one skilled in the art that this procedure between a first and a second control step can be generalized in simple analogy to the procedure between a $(k-1)^{th}$ and a $k^{th}$ control step, with k being a natural number.

The calculation of these quantities can be interpreted as a vector addition in a complex representation. The magnitude of the vector representing the oscillation corresponds to the amplitude, and its orientation represents the phase of the oscillation. The vector of the new compensation corresponds to the sum of the vector of the last compensation and the vector of the disturbance measured during this compensation in relation to the process input. Since the resulting vector can take any angle between 0 and $2\pi$, a differentiation of cases for $\beta_2$ is necessary according to the quadrants of the coordinate system. The present representation, in particular with amplitudes and phases, was primarily chosen because it is highly illustrative for depicting the method according to the present invention. It is also possible and quickly obvious to one skilled in the art that representations for $\beta_2$ without case differentiation can be used as well.

A consequent use of a complex notation for the involved disturbances, process parameters and compensation parameters can result in a simple and equivalent representation of identical connections. In this notation, complex amplitudes of disturbance $a^*$, measurement $c^*$ and compensation $b^*$ with the complex amplifications of filter $G_F^*$ and process $G_P^*$ will be spoken of hereinafter. The complex amplitudes are the representation of the complex numbers calculated from the oscillation parameters amplitude and angle. The complex amplifications are the complex values of the transfer functions at the oscillation frequency under discussion.

The complex amplifications of the process and filter can be summarized as $G_G^*=G_P^*G_F^*$. In the $k^{th}$ sampling step it applies that $c_k^*=a_k^*G_F^*-b_{k-1}^*G_G^*$ and in the $(k+1)^{th}$ sampling step it applies that $c_{k-1}^*=a_{k+1}^*G_F^*-b_k^*G_G^*$. If the disturbance is identical in both sampling steps, that is $a_k^*=a_{k+1}^*$, the requirement of complete compensation ($c_{k+1}^*=0$) results directly in the equation of the compensation control $$b_k^* = \frac{c_k^*}{G_G^*} + b_{k-1}^*.$$

In a $k^{th}$ control step, initially, the complex amplitude of the oscillation can be calculated form the oscillation parameters $c_0$ and $\gamma$ measured via the filtering method according to $$c_k^*=c_0 \cdot e^{j\gamma}$$

or from the orthogonal correlation method according to $$c_k^*=c_x+j \cdot c_y$$

In this context, j denotes the imaginary unit with $j^2=-1$. Thereupon, it is possible to calculate the complex amplitude of $b_k^*$ of the compensation signal. Subsequently, compensation parameters $b_0$ and $\beta$ can be obtained form complex amplitude $b^*$ of the compensation signal via absolute-value generation $b_0=|b^*|$ and phase determination $\beta=\arctan(b^*)$, with the arctan being the main value of the argument of $b^*$ i.e., the angle in the range $-180°<\beta\leq180°$, between the positive direction of the real axle and the position vector $\vec{Ob^*}=(\mathrm{Re}\{b^*\},\mathrm{Im}\{b^*\})$.

In the $(k-1)^{th}$ sampling step, it is applying that $$c_{k-1}^* = a_{k-1}^* G_F^* - b_{k-2}^* G_G.$$

If the disturbance is identical in two successive sampling steps, that is $a_{k-1}^* = a_k^*$, then it ensues that $$G_G^* = \frac{c_k^* - c_{k-1}^*}{b_{k-2}^* - b_{k-1}^*}.$$

This equation is directly suitable for calculating the complex overall amplification $G_G^*$ required for the control.

This embodiment of the method according to the present invention has the particular advantage that the compensation is implemented as a closed-loop control circuit. Thus, it is also possible for unsteady disturbances, in other words those having a variable amplitude and phase, to be well compensated for provided that the changes take place slowly enough in comparison with the sampling time of the compensation control. Moreover, the feedback in the control loop results in that a relatively good compensation is possible even if constants $K_G$ und $\phi_G$ are not precisely known since the method of the compensation control converges under the condition $$2\cos(\phi_{GT}-\phi_G) \geq K_G/K_{GT} \geq 0$$

for the steady-state disturbance and the steady-state process while disregarding measuring errors. In this context, $K_{GT}$ und $\phi_{GT}$ are the real process parameters and $K_G$ and $\phi_G$ are those being used in the compensation control for calculating the compensation. This case is given, for example, in the case of small variations in amplification $K_P$ and phase shift $\phi_P$ of the process during operation.

In an advantageous refinement of the present invention, the method according to the present invention includes an optimum compensation control in which process parameters $K_G = K_P K_F$ und $\phi_G = \phi_P + \phi_F$ required for ensuring optimality are identified at the beginning and/or during the compensation control.

For identification, it is required to carry out at least two measurements of the resulting disturbances at the compensation shaft at different points in time with different compensation parameters. When using in each case two measurements during the identification, parameters $c_{01}$ and $\gamma_1$ are measured at a first instant $t_1$ with active compensation parameters $b_{00}$ und $\beta_0$ and, at a second instant $t_2$, parameters $c_{02}$ und $\gamma_2$ with active compensation parameters $b_{01}$ and $\beta_1$. Using the following calculation instruction, it is possible, for example, to directly calculate amplification $K_{G2}$ and phase shift $\phi_{G2}$ from these eight values at the second instant $t_2$:

$$c=\sqrt{c_{01}^2+c_{02}^2-2c_{01}c_{02}\cos(\gamma_2-\gamma_1)}$$

$$Z_c=-c_{01}\sin(\gamma_1)+c_{02}\sin(\gamma_2)$$

$$N_c=-c_{01}\cos(\gamma_1)+c_{02}\cos(\gamma_2)$$

$$\gamma = \begin{cases} \arctan(Z_c/N_c) & \text{for} \quad N_c > 0 \\ \arctan(Z_c/N_c)+\pi & \text{for} \quad N_c < 0 \\ \pi/2 & \text{for} \quad N_c = 0 \wedge Z_c \geq 0 \\ -\pi/2 & \text{for} \quad N_c = 0 \wedge Z_c < 0 \end{cases}$$

$$b=\sqrt{b_{00}^2+b_{01}^2-2b_{00}b_{01}\cos(\beta_1-\beta_0)}$$

$$Z_b=b_{00}\sin(\beta_0)-b_{01}\sin(\beta_1)$$

$$Z_b=b_{00}\sin(\beta_0)-b_{01}\sin(\beta_1)$$

$$\beta = \begin{cases} \arctan(Z_b/N_b) & \text{for} \quad N_b > 0 \\ \arctan(Z_b/N_b)+\pi & \text{for} \quad N_b < 0 \\ \pi/2 & \text{for} \quad N_b = 0 \wedge Z_b \geq 0 \\ -\pi/2 & \text{for} \quad N_b = 0 \wedge Z_b < 0 \end{cases}$$

$$K_{G2}=c/b$$

$$\phi_{G2}=\gamma-\beta$$

Thus, during a compensation control, updated process parameters $K_{Gi}$ and $\phi_{Gi}$, which for a basis for the further control, can be calculated in each of the control steps at instants $t_i$, where i is a natural number and which i counts off instants. In this context, it is unimportant whether the periods between the individual measurements are equally distributed or accumulated. An identification from only two measurements is possible under three conditions: Firstly, the process parameters should not have changed between the two measurements. Since the filter and the machine control remain substantially unchanged between two control steps, changes of the process parameters can only be caused by changes in the machine dynamics. Since these changes frequently take place very slowly, this requirement is essentially fulfilled. Secondly, the disturbance should not have significantly changed essentially between the two measurements. The rate of change of the phase and amplitude of the disturbance depends on the cause thereof. No general statements can be made on this. Along these lines, it is required to take measurements at instants $t_i$, appropriate periods of time lying between the individual consecutive measurements. Many disturbances have construction-inherent causes such as imbalances, cam discs, or the like. Disturbances of that kind are essentially steady. Thirdly, the measurement should not be influenced by further stochastic disturbances. In the method according to the present invention, the identification is essentially not influenced by stochastic disturbances since the measurements concentrate only on one specific frequency. If the stochastic disturbances are, for instance, white noise, then only a small part of the total energy of the disturbance has an effect for the specific, currently measured frequency $\omega_S$ since only this one is not filtered out. Since measurements are carried out at different instants $t_i$, the method according to the present invention is essentially less sensitive to stochastic, disturbing influences which are limited in time.

As mentioned earlier, the calculation can be carried out by way of orthogonal correlation alternatively to the determination of the oscillation parameters from zero crossings and extremes. The parameters of an oscillation having a complex amplitude can also be determined by a method which is based on correlation calculation.

To determine the real component $c_{x1}$ and imaginary component $c_{y1}$ of the complex amplitude of an oscillation $c(\phi)=c_{x1}\sin(r_1\cdot\phi)+c_{y1}\cos(r_1\cdot\phi)$, one calculates the cross-correlated of the measured signal for the reference angle signal for angles 0° und 90°. In the case of a correlation over an integral multiple of half oscillation periods, i.e., from $\phi_0$ to $\phi_1=\phi_0+n\pi/r_1$, it applies for the estimate of the real component of the oscillation obtained via the orthogonal correlation that $$\hat{c}_{xI} = \frac{2}{\varphi_1 - \varphi_0}\int_{\varphi_0}^{\varphi_1} c(r_1\varphi)\sin(r_1\varphi)d\varphi = \frac{2}{\varphi_1 - \varphi_0}\int_{\varphi_0}^{\varphi_1}(c_{xI}\sin(r_1\varphi)+c_{yI}\cos(r_1\varphi))\sin(r_1\varphi)d\varphi$$

$$= c_{xI}\left(1 - \frac{\sin(2r_1\varphi_1) - \sin(2r_1\varphi_0)}{2r_1(\varphi_1 - \varphi_0)}\right) + c_{yI}\frac{\cos(2r_1\varphi_0) - \cos(2r_1\varphi_1)}{2r_1(\varphi_1 - \varphi_0)} = c_{xI}$$

For the estimate of the imaginary component, it correspondingly applies that $$\hat{c}_{yI} = \frac{2}{\varphi_1 - \varphi_0}\int_{\varphi_0}^{\varphi_1} c(r_1\varphi)\cos(r_1\varphi)d\varphi$$

$$= \frac{2}{\varphi_1 - \varphi_0}\int_{\varphi_0}^{\varphi_1}(c_{xI}\sin(r_1\varphi)+c_{yI}\cos(r_1\varphi))\cos(r_1\varphi)d\varphi$$

$$= c_{xI}\frac{\cos(2r_1\varphi_0) - \cos(2r_1\varphi_1)}{2r_1(\varphi_1 - \varphi_0)} + c_{yI}\left(1 + \frac{\sin(2r_1\varphi_1) - \sin(2r_1\varphi_0)}{2r_1(\varphi_1 - \varphi_0)}\right) = c_{yI}$$

In the case of discrete-time systems, the calculation equations then read $$\hat{c}_{xI} = \frac{2}{\varphi(k_1) - \varphi(k_0)}\sum_{k=k_0+1}^{k_1} c(k)\sin(r_1\varphi(k))(\varphi(k) - \varphi(k-1))$$

and $$\hat{c}_{yI} = \frac{2}{\varphi(k_1) - \varphi(k_0)}\sum_{k=k_0+1}^{k_1} c(k)\cos(r_1\varphi(k))(\varphi(k) - \varphi(k-1))$$

In this context, $\phi(k)$ is the angle and $c(k)$ is the compensation signal appertaining to sampling step k, and it applies that $$\varphi(k_1) \approx \varphi(k_0) + \frac{n\pi}{r_1}$$

if differential angle $\phi(k)-\phi(k-1)$ remains constant or, as an approximation, it is also possible to use $$\hat{c}_{xI} = \frac{2}{k_1 - k_0}\sum_{k=k_0+1}^{k_1} c(k)\sin(r_1\varphi(k)) \text{ and}$$

$$\hat{c}_{yI} = \frac{2}{k_1 - k_0}\sum_{k=k_0+1}^{k_1} c(k)\cos(r_1\varphi(k))$$

Since $\phi_{Ref}(k)=r_1\phi(k)$ is calculated for the compensation anyway, only two trigonometric functions and two multiplications need to be calculated in this connection for the correlation in each sampling step so that the computational outlay is relatively small.

If the compensation signal contains further orders, then systematic errors arise in the calculation of the correlation, it being possible for the errors to be estimated. If, in addition to compensation order $r_1$, a further order $r_2$ is contained in the compensation signal, then the compensation signal has the shape $$c(\phi)=c_{x1}\sin(r_1\cdot\phi)+c_{y1}\cos(r_1\cdot\phi)+c_{x2}\sin(r_2\cdot\phi)+c_{y2}\cos(r_2\cdot\phi)$$

For the estimate of the real component of the oscillation obtained via the orthogonal correlation, when integrated over $\phi_0$ to $\phi_1=\phi_0+n\pi/r_1$, it applies that $$\hat{c}_{xI} = \frac{2}{\varphi_1 - \varphi_0}\int_{\varphi_0}^{\varphi_1} c(r_1\varphi)\sin(r_1\varphi)d\varphi = c_{xI} +$$

$$\frac{2}{\varphi_1 - \varphi_0}\int_{\varphi_0}^{\varphi_1}(c_{x2}\sin(r_2\cdot\varphi) + c_{y2}\cos(r_2\cdot\varphi))\sin(r_1\varphi)d\varphi$$

$$= c_{xI} + \left(c_{x2}\frac{\sin((r_1 - r_2)\varphi_1) - \sin((r_1 - r_2)\varphi_0)}{(r_1 - r_2)(\varphi_1 - \varphi_0)} + \right.$$

$$c_{y2}\frac{\cos((r_1 - r_2)\varphi_0) - \cos((r_1 - r_2)\varphi_1)}{(r_1 - r_2)(\varphi_1 - \varphi_0)}\right) +$$

$$\left(c_{x2}\frac{\sin((r_1 + r_2)\varphi_0) - \sin((r_1 + r_2)\varphi_1)}{(r_1 + r_2)(\varphi_1 - \varphi_0)} + \right.$$

$$\left. c_{y2}\frac{\cos((r_1 + r_2)\varphi_0) - \cos((r_1 + r_2)\varphi_1)}{(r_1 + r_2)(\varphi_1 - \varphi_0)}\right)$$

The equivalent applies to the estimate of the imaginary component of the oscillation obtained via the orthogonal correlation, when integrated over $\phi_0$ to $\phi_1=\phi_0+n\pi/r_1$ $$\hat{c}_{yI} = \frac{2}{\varphi_1 - \varphi_0}\int_{\varphi_0}^{\varphi_1} c(r_1\varphi)\cos(r_1\varphi)d\varphi = c_{yI} +$$

$$\frac{2}{\varphi_1 - \varphi_0}\int_{\varphi_0}^{\varphi_1}(c_{x2}\sin(r_2\cdot\varphi) + c_{y2}\cos(r_2\cdot\varphi))\cos(r_1\varphi)d\varphi$$

$$= c_{yI} + \left(c_{x2}\frac{\cos((r_1 - r_2)\varphi_1) - \cos((r_1 - r_2)\varphi_0)}{(r_1 - r_2)(\varphi_1 - \varphi_0)} + \right.$$

$$\left. c_{y2}\frac{\sin((r_1 - r_2)\varphi_1) - \sin((r_1 - r_2)\varphi_0)}{(r_1 - r_2)(\varphi_1 - \varphi_0)}\right)$$

$$= c_{yI} + \left(c_{x2}\frac{\cos((r_1 - r_2)\varphi_1) - \cos((r_1 - r_2)\varphi_0)}{(r_1 - r_2)(\varphi_1 - \varphi_0)} + \right.$$

$$\left. c_{y2}\frac{\sin((r_1 - r_2)\varphi_1) - \sin((r_1 - r_2)\varphi_0)}{(r_1 - r_2)(\varphi_1 - \varphi_0)}\right)$$

The denominator of the fractions contains the factor $(r_1-r_2)$ in the first parenthetical expression, respectively. Their contribution to the error is therefore large especially for orders $r_2$ which are close to compensation order $r_1$. To improve the quality of the measured values, it is useful to reduce this error as far as possible. In the following, different methods for this purpose will be presented which can be used individually or in combination with one another.

If the correlation is carried out over angles from $\phi_0$ to $$\varphi_1 = \varphi_0 + \frac{2n\pi}{(r_1 - r_2)},$$

i.e. multiples of the beat period, then the first parenthetical expression yields 0. Therefore, one way to largely reduce the error is to select only multiples of the half oscillation period as the correlation period which multiples are as close as possible to multiples of the beat period.

Another way consists in calculating the disturbing error terms $$e_{1x} = \frac{\sin((r_1 - r_2)\varphi_1) - \sin((r_1 - r_2)\varphi_0)}{(r_1 - r_2)(\varphi_1 - \varphi_0)}$$

$$e_{1y} = \frac{\cos((r_1 - r_2)\varphi_0) - \cos((r_1 - r_2)\varphi_1)}{(r_1 - r_2)(\varphi_1 - \varphi_0)}$$

and, via the equations $$\hat{c}_{x1} = \hat{c}_{x1} - c_{x2} \cdot e_{1x} - c_{y2} \cdot e_{1y}$$

$$\hat{c}_{y1} = \hat{c}_{y1} - c_{x2} \cdot e_{1y} - c_{y2} \cdot e_{1x}$$

to subtract the errors from the estimates $\hat{c}_{x1}$ and $\hat{c}_{x1}$ of the oscillation which were calculated via the correlation. Required parameters $c_{x2}$ and $c_{y2}$ of order $r_2$ can also be estimated for this purpose using the correlation method. The repercussion of order $r_1$ on order $r_2$ can also be eliminated in this manner. Thus, mutual disturbances can be iteratively eliminated.

It is also possible to solve the system of equations $$\begin{bmatrix} \hat{c}_{x1} \\ \hat{c}_{y1} \\ \hat{c}_{x2} \\ \hat{c}_{y2} \end{bmatrix} = \begin{bmatrix} 1 & 0 & e_{1x} & e_{1y} \\ 0 & 1 & -e_{1y} & e_{1x} \\ e_{2x} & e_{2y} & 1 & 0 \\ -e_{2y} & e_{2x} & 0 & 1 \end{bmatrix} \cdot \begin{bmatrix} \hat{c}_{x1} \\ \hat{c}_{y1} \\ \hat{c}_{x2} \\ \hat{c}_{y2} \end{bmatrix}$$

with $$e_{1x} = \frac{\sin((r_1 - r_2)\varphi_{11}) - \sin((r_1 - r_2)\varphi_{01})}{(r_1 - r_2)(\varphi_{11} - \varphi_{01})}$$

$$e_{1y} = \frac{\cos((r_1 - r_2)\varphi_{01}) - \cos((r_1 - r_2)\varphi_{11})}{(r_1 - r_2)(\varphi_{11} - \varphi_{01})}$$

$$e_{2x} = \frac{\sin((r_1 - r_2)\varphi_{12}) - \sin((r_1 - r_2)\varphi_{02})}{(r_1 - r_2)(\varphi_{12} - \varphi_{02})}$$

$$e_{1y} = \frac{\cos((r_1 - r_2)\varphi_{02}) - \cos((r_1 - r_2)\varphi_{12})}{(r_1 - r_2)(\varphi_{12} - \varphi_{02})}$$

which yields $$\begin{bmatrix} \hat{c}_{x1} \\ \hat{c}_{y1} \\ \hat{c}_{x2} \\ \hat{c}_{y2} \end{bmatrix} = \frac{1}{\det K} \begin{bmatrix} A_{11} & A_{21} & A_{31} & A_{41} \\ -A_{21} & A_{11} & -A_{41} & A_{31} \\ A_{13} & A_{23} & A_{11} & A_{21} \\ -A_{23} & A_{13} & -A_{21} & A_{11} \end{bmatrix} \cdot \begin{bmatrix} \hat{c}_{x1} \\ \hat{c}_{y1} \\ \hat{c}_{x2} \\ \hat{c}_{y2} \end{bmatrix}$$

with cofactors and determinant $$A_{11} = 1 - e_{1x}e_{2x} + e_{1y}e_{2y}$$

$$A_{21} = e_{1x}e_{2y} + e_{2x}e_{1y}$$

$$A_{31} = (e_{1x}^2 + e_{1y}^2)e_{2x} - e_{1x}$$

$$A_{41} = -(e_{1x}^2 + e_{1y}^2)e_{2y} - e_{1y}$$

$$A_{13} = (e_{2x}^2 + e_{2y}^2)e_{1x} - e_{2x}$$

$$A_{23} = -(e_{2x}^2 + e_{2y}^2)e_{1y} - e_{2y}$$

$$\det K = 1 - 2e_{1x}e_{2x} + 2e_{1y}e_{2y} + (e_{1x}^2 + e_{1y}^2)(e_{2x}^2 + e_{2y}^2)$$

If correlation angles $\varphi_{01}$ and $\varphi_{11}$ of order $r_1$ and correlation angles $\varphi_{02}$ and $\varphi_{12}$ of order $r_2$ are equal, then the calculations are considerably simplified since it then applies that $e_{2x} = e_{1x}$ and $e_{2y} = -e_{1y}$, and because the resulting symmetrical matrix can be inverted more easily.

It is particularly advantageous in the identification of the compensation parameters in the method according to the present invention that no assumptions are required on the dynamics of the process as, for example, the number of poles and zero values of the process transfer function. Instead, the amplification and phase shift are required and also identified for a specific frequency of the process.

In advantageous refinement of the present invention, it is also possible for the process parameters to be calculated using statistic methods such as a sliding averaging from a larger number of measurements or the like, instead of only from two measurements. In this context, to keep the identification error, i.e., the deviation between the calculated and the actual compensation parameters, arising due to time-related changes of the process parameters and, above all, of disturbances as low as possible, it is in each case possible to initially calculate process parameters $K_{Gi}$ and $\phi_{Gi}$ as specified above from two measurements which are successive in time, and to calculate from the so determined values final process parameters $K_{Gi}^*$ and $\phi_G^*$ at different points in time using statistical methods.

The less the used compensation parameters of the two measurements differ, the lower is also the quality of the identification. If the process parameters were calculated relatively well, then a compensation control working with these parameters can substantially eliminate the disturbance. In the case of a steady-state disturbance and steady-state process, this will result in approximately constant compensation parameters $b_0$ and $\beta$. This problem is typical of adaptive controls. This can be solved by a monitoring which switches the identification off in the case of too small differences of the compensation parameters which are active during the measurements. In this case, the process parameters are known anyway, and no further calculation is required.

The calculation instruction specified above of the method according to the present invention includes in particular also the case that one of the two measurements is carried out without compensation. This produces, inter alia, two advantages. Firstly, the computational outlay is only half as high and, secondly, it is possible for the process parameters to be well calculated in only one identification step already at the second measurement if an appropriate compensation is used since the compensation parameters differ sufficiently during both measurements.

During the identification of the process parameters, the compensation of a specific order r or frequency $\omega_S$ can also be carried out completely without knowing the disturbance and the process itself. To this end, initially, a measurement can be carried out without compensation and one with compensation settings which differ therefrom for a first identification of the process parameters. Using these values, it is possible to carry out a compensation with variable parameters or with a control. Extensive calculations during the operation of the machine are then dropped. An adaptive compensation control with online identification has the special advantage in addition to the advantages of the simple compensation control that a good compensation is achievable even with process parameters which strongly vary during the operation of the machine. Since the complex calculation of the identification is not time-critical, it can be carried out on inexpensive hardware and, possibly, even on existing controller hardware along with the normal machine control.

It should further be pointed out that, when using a filter, the use of defined filter transient recovery times is variable. In other words, via the selection of the transient recovery period, it is possible, for example, to attain a rapid reduction of large oscillation amplitudes or, in the case of a comparatively longer transient recovery time, to reduce the oscillation increasingly better or to eliminate it.

It is clear to one skilled in the art that the method according to the present invention can also be used, although with restrictions, even in the case of non-linear processes in which certain different orders or frequencies mutually influence one another. When taking measures against disturbances in a non-linear process, it is an important point that concurrent changes in the compensation signals of orders which mutually influence one another are prevented in a controlled manner during the process identification or that the identification is limited to measuring points at which signals which mutually influence one another do not significantly vary at the same time.

The method according to the present invention can be implemented at a specific real or virtual machine shaft in a printing unit or in a printing unit group, i.e., in a machine part containing one or a plurality of printing units. The method according to the present invention can in particular also be applied to the oscillation compensation for the relative position, relative speed or relative acceleration between different machine parts. The machine shaft is directly or indirectly driven via an actuator, and the printing unit or the printing unit group has a measuring device for picking up the oscillation of the machine shaft. Using at least one filter associated with the measuring device, in particular a bandpass filter or the like, the amplitude and phase of a number n of discrete frequency components with angular frequency $\omega_{Si}$ is determined, with i=1 to n being a natural number. This measurement is used to electronically generate a control signal therefrom so that a compensation upon the machine shaft is possible via the actuator. It is clear to one skilled in the art that the method according to the present invention can also be applied to a plurality of machine shafts within one or a plurality of printing units or printing unit groups. A printing machine according to the present invention has at least one printing unit or printing unit group of that kind.

An harmonic torque as defined herein includes substantially harmonic torques.

| List of Reference Symbols |
| --- |
| 1. Source of disturbance |
| 2. Oscillation a having an amplitude $a_0$ and a phase $\alpha$ |
| 3. Summing point |
| 4. Signal |
| 5. Measuring device |
| 6. Measured signal |
| 7. Filter |
| 8. Measured signal c having an amplitude $c_0$ and a phase $\gamma$ |
| 9. Arithmetic unit |
| 10. Manipulated variable b having an amplitude $b_0$ and a phase $\beta$ |
| 11. Actuator |
| 12. Process |
| 13. Harmonic torque having an amplitude $K_P b_0$ and a phase $\beta + \phi_P$ |
| 14. Printing Unit/Press |

What is claimed is:

1. A method for compensating for a mechanical oscillation at a machine shaft via at least one actuator acting directly or indirectly upon the machine shaft, the oscillation having a frequency spectrum capable of being approximated by a number of discrete frequency components, the method comprising the steps of:

measuring the amplitude and phase of at least one of the discrete frequency components at at least one specific point in time;

calculating at least one pair of amplitudes and phases of the harmonic torque in a closed adaptive control loop, wherein process parameters required for the calculation are updated during the control on the basis of at least two measurements of resulting disturbances at the machine shaft at different points in time with different compensation parameters; and superposing upon the at least one of the discrete frequency components of the mechanical oscillation, via the actuator, independently of the other of the discrete frequency components, at least one harmonic torque of a same frequency having a specific amplitude and phase in such a manner that an amplitude of the oscillation of the machine shaft at the same frequency is reduced.

2. The method for compensating for a mechanical oscillation as recited in claim 1, wherein the harmonic torque has a frequency independent of the time.

3. The method for compensating for a mechanical oscillation as recited in claim 1, wherein the frequency of the harmonic torque is at a fixed ratio r, with r being a real number, to the angular speed of the machine shaft.

4. The method for compensating for a mechanical oscillation as recited in claim 1, wherein the amplitude and phase of the harmonic torque for compensation are independent of a machine speed.

5. The method for compensating for a mechanical oscillation as recited in claim 1, wherein the amplitude and phase of the harmonic torque for compensation are a function of a machine speed.

6. The method for compensating for a mechanical oscillation as recited in claim 1, wherein the amplitude or phase of the compensating harmonic torque are determined from at least one of a measurement of the amplitude and phase of the corresponding frequency component of the mechanical oscillation of the machine shaft and of a signal calculated from a signal of one or a plurality of machines shafts.

7. The method as recited in claim 6 wherein the signal is the differential signal of one or a plurality of machine shafts.

8. The method for compensating for a mechanical oscillation as recited in claim 1, wherein the parameters required for calculating the amplitude and phase of the corresponding harmonic torque are at least partially determined from measurements of the amplitude and phase of the corresponding frequency component of the mechanical oscillation of the machine shaft.

9. The method for compensating for a mechanical oscillation as recited in claim 1, wherein the frequency of the harmonic torque is determined as a function of a natural frequency of a machine having the machine shaft.

10. The method for compensating for a mechanical oscillation as recited in claim 1, wherein the frequency of the harmonic torque is determined as a function of the speed of a machine having the machine shaft.

11. The method for compensating for a mechanical oscillation as recited in claim 1, wherein the oscillation is a rotational oscillation.

12. The method for compensating for a mechanical oscillation as recited in claim 1, wherein the machine shaft is in a printing unit or in a printing machine.

* * * * *